United States Patent
Thoresson et al.

(10) Patent No.: US 7,801,567 B2
(45) Date of Patent: Sep. 21, 2010

(54) METHOD FOR PROVIDING ALERTS IN A MOBILE DEVICE AND MOBILE DEVICE THEREFOR

(75) Inventors: Johan Thoresson, Lund (SE); Claes Källqvist, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 605 days.

(21) Appl. No.: 11/719,974

(22) PCT Filed: Nov. 1, 2005

(86) PCT No.: PCT/EP2005/055681

§ 371 (c)(1),
(2), (4) Date: May 23, 2007

(87) PCT Pub. No.: WO2006/058812

PCT Pub. Date: Jun. 8, 2006

(65) Prior Publication Data

US 2008/0057910 A1  Mar. 6, 2008

(30) Foreign Application Priority Data

Nov. 30, 2004  (EP) .................................. 04106184

(51) Int. Cl.
*H04M 1/00* (2006.01)
*H04K 3/00* (2006.01)
(52) U.S. Cl. ...................................... 455/566; 340/7.51
(58) Field of Classification Search ... 455/412.1–412.2, 455/566; 340/7.51–7.52; 379/88.13, 88.22
See application file for complete search history.

(56) References Cited

U.S. PATENT DOCUMENTS

| 6,249,668 | B1 * | 6/2001 | Abe et al. ..................... 340/7.2 |
| 6,456,841 | B1 | 9/2002 | Tomimori |
| 6,721,402 | B2 | 4/2004 | Usami |
| 2002/0154746 | A1 | 10/2002 | Usami |
| 2004/0066932 | A1 | 4/2004 | Seligmann |

FOREIGN PATENT DOCUMENTS

CN            1247441          3/2000

(Continued)

OTHER PUBLICATIONS

EP Communication for corresponding Application No. 04 106 184.7 dated Nov. 20, 2008.

(Continued)

*Primary Examiner*—Lee Nguyen
(74) *Attorney, Agent, or Firm*—Renner, Otto, Boisselle & Sklar, LLP

(57) ABSTRACT

The invention relates to a method for providing alerts in a mobile device, and more particularly a method for providing a shortcut for displaying and hiding alerts by providing an event list that is shown automatically or accessible by a shortcut button. The invention also relates to a corresponding mobile device. Thus, the invention provides a method for providing alerts in a mobile device having a display and a keypad. The method comprises the steps of: detecting an event; adding an event presentation (5) associated with the event on an event list (4); and showing the event list or a symbol (8) on the display. The event list is shown automatically for critical alerts and is accessible with one key stroke for less critical alerts. The user can choose to hide the list, also with a single key stroke, or act on an event.

24 Claims, 2 Drawing Sheets

FOREIGN PATENT DOCUMENTS

| | | |
|---|---|---|
| CN | 1383301 | 12/2002 |
| EP | 1 233 599 | 8/2002 |
| EP | 1 333 650 | 8/2003 |
| GB | 2 326 051 | 12/1998 |
| JP | 4-178045 | 6/1992 |
| JP | 10-283156 | 10/1998 |
| JP | 2000050332 * | 2/2000 |
| JP | 2002-318770 | 10/2002 |
| RU | 2 159 012 | 11/2000 |
| WO | 03/075547 | 9/2003 |

OTHER PUBLICATIONS

International Search Report for corresponding Application No. PCT/EP2005/055681 mailed Feb. 6, 2006.

Chinese Office Action for corresponding Application No. 200580041042.9 dated Jul. 3, 2009.

Microsoft Corp.; "Microsoft Mail for PC Networks Windows client User's Guide," vol. 1; Aug. 1, 1995; pp. 9-13, 26-29, 41-42; Abstract.

* cited by examiner

METHOD FOR PROVIDING ALERTS IN A MOBILE DEVICE AND MOBILE DEVICE THEREFOR

FIELD OF THE INVENTION

The present invention relates to a method for providing alerts in a mobile device, and more particularly a method for providing a shortcut for displaying and hiding alerts by providing an event list that is shown automatically or accessible by a shortcut button. The invention also relates to a corresponding mobile device.

BACKGROUND

A mobile phone has to handle events, such as incoming network carried events or just "local" status changes in an application within the phone, and provide information to the user for him to respond to or reflect upon in one way or another. It can be everything from incoming calls, new messages, alarms and calendar reminders to network status and battery information.

Some of those events are considered critical enough to demand user attention and prompt the user with an alert, such as the pop-up alerts used e.g. for incoming calls and new messages in mobile phones.

Other events are considered less critical and are handled in other ways, e.g. changes in level of network coverage. In certain phones these changes are communicated to the user via a status bar at the top of the display.

How critical an event is depends on what the user is doing at the moment and the status of the telephone. For example, if a call is in progress there is usually no pop-up alert but only a symbol is shown in the status bar.

STATE OF THE ART

In mobile phones of today, the above mentioned pop-up is used to inform the user of an event and to prompt the user with the possibility to respond to the event. The pop-up appears on top of the user interface, UI. An example is shown in FIG. 2. The pop-up offers the user a one click access to the event but forces the user to respond to the event (Yes or No) to be able to continue and remove the pop-up from the display.

Some home screen/idle screen solutions collect missed calls and new messages in a list accessible in a standby screen. An example of one new message is shown in FIG. 3. The user can see a summary of all missed calls and new messages and choose when and in what order to access the events.

Desktop computers, handheld computers and smart phones often have task trays or status bars that hold interactive status indicating icons. An example is shown in FIGS. 4A and 4B. In FIG. 4A the task tray is not activated but the display is interactive as the user can click on an icon and get a number of alternatives as is shown in FIG. 4B.

Some phones have an icon shortcut solution that is activated with joystick interaction. An example is shown in FIG. 5. One of the shortcuts is to the new message. In this case, the user is not provided with any other information about the message except that there is a new message and the user can only choose to open it, not any other kind of action.

Problems

As the pop-ups take charge of the whole UI and force the user to make an immediate response, they are intrusive. With being intrusive follows that they should only be used for really critical events.

The pop-up cannot be dismissed and retrieved again, which makes it non-dismissible and non-retrievable. Choosing not to access the event immediately means that the user will have to find it "the long way" through the menu system.

Only one pop-up can be visible and have focus at the time and the user can not decide which one to be in focus. They appear in a non-flexible order, e.g. a missed call will always be placed on top of a new message, often based on a predefined chronological order.

Displaying status changes in the status bar is, on the other hand, not at all intrusive. But in non-touch phones it gives the user no chance to act upon what is shown in an easy way. If the user wants to respond to a change, he or she will have to interpret the icon in the status bar and understand where to find the right place in the phone's menu system and will not be provided a shortcut, as the status bar is not interactive without a touch screen. This means that only the most critical events provide the user with a shortcut.

The main problem with the standby list display is that it can only be accessed from the standby screen and that it only handles a few types of events. The same problem can also be found in the icon shortcut solution that also has the problem that it is not very informative. Another problem with the standby list display is that it is a bit intrusive, as it is always visible in standby and is therefore covering a part of the background wallpaper.

With the interactive status bar, the main problem is that this solution requires a mouse pointer or a touch based UI—or some kind of highlight that is not present in any known mobile phone implementation of this concept. Another problem with the icon shortcut solution and the status bar is that they do not provide any detailed information.

SUMMARY OF THE INVENTION

The invention solves these problems by providing an event list, which contains representations of events. The event list is shown automatically for critical alerts and is accessible with one key stroke for less critical alerts. The user can choose to hide the list, also with a single key stroke, or act on an event.

In a first aspect the invention provides a method for providing alerts in a mobile device having a display and a keypad.

In accordance with the invention, the method comprises the steps of: detecting an event; adding an event presentation associated with the event on an event list; and showing the event list or a symbol on the display.

Preferably, events belong to two categories, and, if a detected event belongs to the first category, the event list is shown automatically, but if a detected event belongs to the second category, the symbol is shown on the display, and the event list is shown on user command only.

After showing the event list, the event list may be hidden on user command.

Also, the event list may be shown on user command.

Suitably, the user commands hiding and showing of the event list by pressing a button of the keypad.

Preferably, detailed information about an event is shown when the corresponding event presentation in the event list is marked.

Preferably, an event presentation is removed from the event list when the corresponding event has been dealt with.

Suitably, event presentations are added in chronological order, preferably the most recent at the top of the event list.

Event presentations may be arranged in prioritised groups, where groups having higher priority are shown at the top of the event list.

The prioritised groups may be arranged in accordance with user settings.

Said symbol may be a specific symbol for a hidden event list or a symbol associated with a new event.

In a second aspect the invention provides a mobile device having a display, a keypad and means for detecting events.

In accordance with the invention, the device comprises means for storing an event list containing event presentations associated with various events, the mobile device being arranged to:

detect an event;

add an event presentation associated with the event on the event list; and show the event list or a symbol on the display.

Preferably, events belong to two categories, the detection means being arranged to distinguish between the two categories, and the mobile device is arranged to show the event list automatically, if a detected event belongs to the first category, but to show the symbol on the display, and the event list on user command only, if a detected event belongs to the second category.

Suitably, the mobile device is arranged, after showing the event list, to hide the event list on user command.

Also, the mobile device may be arranged to show the event list on user command.

Suitably, the keypad comprises a button for hiding and showing of the event list.

Preferably, the event list has a layered structure, so that each event presentation may carry detailed information in a lower layer.

Preferably, the mobile device is arranged to show detailed information about an event when the corresponding event presentation in the event list is marked.

Preferably, the mobile device is arranged to remove an event presentation from the event list when the corresponding event has been dealt with.

Suitably, the mobile device is arranged to add event presentations in chronological order, preferably the most recent at the top of the event list.

The mobile device may be arranged to add event presentations in prioritised groups, where groups having higher priority are shown at the top of the event list.

The prioritised groups may be arranged in accordance with user settings.

Said symbol may be a specific symbol for a hidden event list or a symbol associated with a new event.

The mobile device may be a mobile telephone, a pager, a communicator, an electric organiser, a smartphone or a computer.

BRIEF DESCRIPTION OF THE DRAWINGS

The invention will be described in detail below with reference to the accompanying drawings, of which.

DETAILED DESCRIPTION OF PREFERRED EMBODIMENTS

The invention will be described with reference to a mobile telephone, but the invention is equally applicable to other devices such as pagers, communicators, electric organizers, smart phones or portable computers. The common feature is that alerts are generated either from the outside, such as when receiving calls and messages, or internally, such as receiving reminders from a calendar function, status information etc. The invention is implemented by control software in the device. The software may be designed by persons skilled in the art without inventive effort.

Figure 1:
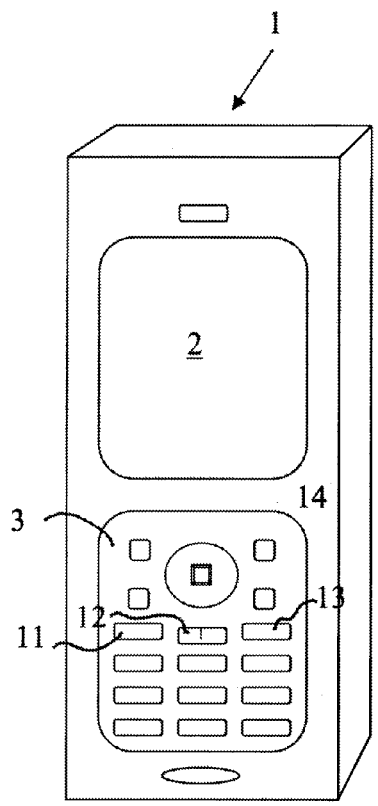
FIG. 1 is a schematic overview of a mobile telephone adapted to incorporate the present invention.
Figure 2:
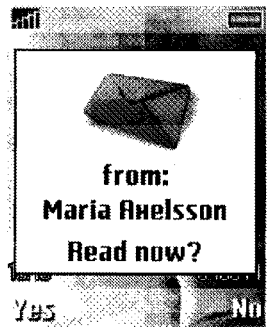
FIG. 2 is an illustration of a display with a pop-up alert according to prior art.
Figure 3:
FIG. 3 is an illustration of a display with a standby list display according to prior art.
Figure 5:
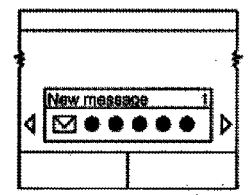
FIG. 5 is an illustration of a display with an icon shortcut, according to prior art.
Figure 4A:
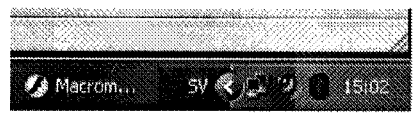
FIGS. 4A and 4B are illustrations of a display with a Windows tray not activated and activated, respectively, according to prior art.
Figure 4B:

FIG. 1 illustrates a typical mobile telephone 1 with a display 2 and a keypad 3. The keypad 3 contains the usual buttons used for operating the device, including a number of soft buttons 11, 12, 13, whose functions depend on the actual situation and are shown by legends in the display. Alternatively, the device may be provided with a touch screen. Then some of the buttons are arranged directly on the screen display. The keypad 3 also contains a navigation device 14, such as a joystick or the like. The device 1 also contains storage means for storing the control software and an event list as explained in detail below.

The present invention provides an interactive and retrievable but less intrusive alerting system. The first main feature of the invention is an event list that can contain all kinds of events with a high level of details. The second main feature of the invention is that, regardless of what state the phone is in or what application is currently in focus, the event list can be retrieved (shown) and dismissed (hidden) by the user with only one key press.

The event list will contain all different events that have happened until the user chooses to act upon them or to delete them. The user can choose what events to act upon regardless of priorities and chronological order. Some events (more critical) can automatically bring the event list to the front, while other (less critical) can just be added to the list and give the user a status indication and the user himself can bring the event list to the front if he wants to. In both cases the list can be dismissed and retrieved as the user wishes.

Thus, the events are suitably classified into two main groups or categories, the first category involving automatic display of the event list and the second category involving display of an alert symbol. Display of the event list and display of the symbol may both be accompanied by an audible signal. The first group contains e.g. alerts regarding new messages and calendar reminders. The second group contains e.g. alerts about coverage information, lost calls, pushed news and battery information etc. In one embodiment, the user can adjust the settings of the device so that he can arrange the events in any of the two groups in accordance with his own preferences.

Figure 6A:
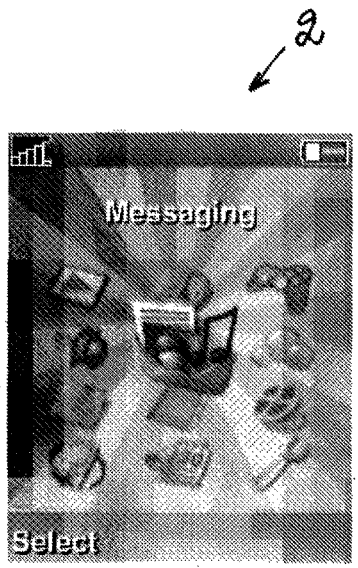
FIG. 6A is an illustration of a display in a basic desktop state according to the invention.

FIG. 6A illustrates an example of a basic standby desktop display. The desktop display includes a wallpaper with a number of icons, which can be selected by the joystick and/or the soft buttons. In FIG. 6A the event list according to the invention is empty.

Figure 6B:
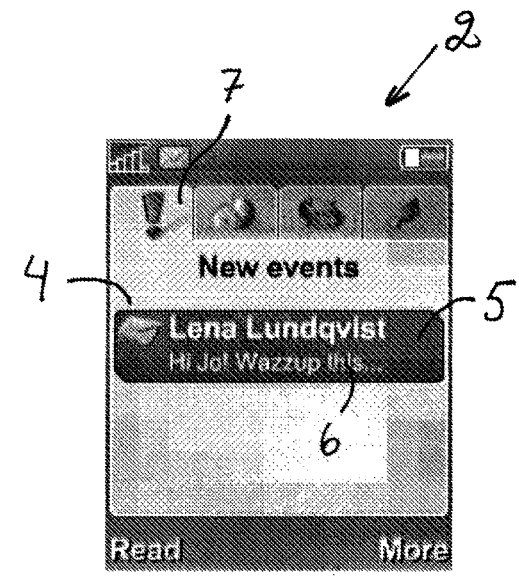
FIG. 6B is an illustration of a display showing an event list with one item according to the invention.

FIG. 6B illustrates the display shown when a new message arrives. The control software comprises detections means that detects the new event and its associated category. The event "arrival of new message" normally belongs to the first category and the event list 4 with an event presentation 5 is shown automatically. Since this instance of the event list only includes one item/event, it is already marked by highlighting or otherwise, and the event presentation 5 also includes detailed information 6. In the case of messages the detailed information may be the beginning of the message or date and time of arrival. Alternatively, the detailed information can switch automatically between different pieces of detailed information.

The user can choose to act on the event, e.g. by pressing one soft button to read the message or another soft button to enter a submenu, e.g. for writing a response. As shown in this example, the soft button 11 means Read and soft button 13 means More. When the event is dealt with, the event presentation is removed from the event list. The event presentation is also removed if the user chooses to delete it actively, e.g. with the usual clear (c) button. Of course, the message as such remains and may be retrieved in the normal way through the device's menu system.

The user can also choose not to act, in other words saving dealing with the event till later. According to the invention he just presses another button, suitably the button 12 marked with an! This keystroke results in that the event list is hidden. However, as the event is not acted upon, the contents of the event list is not changed but the event presentation 6 remains. The user can retrieve the event list by pressing a key, suitably the same key as for hiding the event list. Alternatively, this button! may be a hard button with this function only and can be located on any suitable location on the device 1.

Figure 6C:
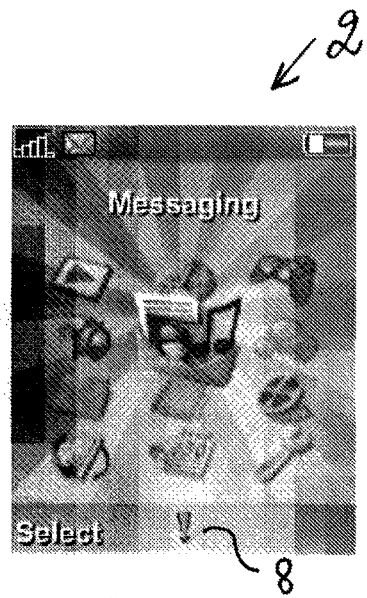
FIG. 6C is an illustration of a display showing a display with a symbol for a hidden event list.

FIG. 6C shows an example when the display contains an item but is hidden. A symbol! is shown at the bottom, corresponding the position of the button 12. The symbol! means that the event list contains an outstanding item. The symbol remains until all events have been dealt with. In stead of the event list symbol!, there could be a symbol specifically associated with an event, e.g. the latest added event, for example an envelope symbol for a new message.

If an event belonging to the second group occurs, i.e. an event that is not critical and does not require the event list to be shown automatically, the appearance of the display will also be as shown in FIG. 6C. Thus, the symbol! will be lit, if the new event is the first on the event list. The symbol! could also be flashed off and on repeatedly, if a new non-critical item is added to the event list. This can be accompanied by an audible signal in accordance with the users preferred settings. As before, the user can cause the event list to be shown and subsequently hidden by pressing the button!.

Figure 6D:
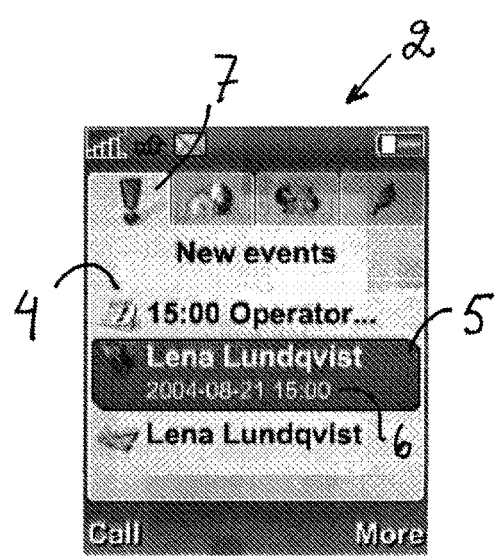
FIG. 6D is an illustration of a display showing an event list with several items.

FIG. 6D illustrates an event list containing several event presentations 5. Detailed information 6 is only shown for the marked event presentation, in order to save space and show a greater number of event presentations. The user can select which event presentation to mark, suitably with the joystick 14.

The event list has a layered structure such that the main event presentation is associated with detailed information in a lower layer.

New events are added to the event list in a chronological order, so that the most recent events are shown at the top of the list. The events could also be arranged in another order, for example by prioritising certain types of alerts over other types. For example, the event "lost call" could always be placed at the top, thereafter "new messages" and "pushed news" at the bottom. Within a group the events are added in chronological order. All this could be decided by the user by adjusting his preferred settings of the device.

As shown in FIGS. 6B and 6D the event list is one tab 7 of a tab list. The other tabs are suitably other frequently used functions accessible by shortcut buttons. The other tabs do not form any part of the present invention.

In some operation modes, such as camera mode or call in progress, the user should not be bothered with any alerts at all. In this case, events are just added to the event list and the event list or a symbol, as the case may be, is shown as soon as the critical operation mode is terminated. Also, the location of the event list symbol on the display could be occupied by another symbol having higher priority. Then, the event list symbol is shown first after the other symbol has been removed.

The invention has several advantages over the prior art. The invention introduces less intrusive, interactive, informative, dismissible and retrievable alerts that can make the use of a mobile phone more flexible than with the alerts used today. Users themselves can decide when to view, hide and respond to an alert. An alert can be dismissed and retrieved without loosing any options.

As the alerts are less intrusive they can be used for alerting users of things that are not considered extremely critical, but also for funny things that will improve the user experience, such as calendar reminders, pushed news, operator and phone application promotion.

Alerts can be left unaccessed without limiting the user of the phone and without interfering with the standby wallpaper.

As the user can browse between alerts, implemented priority rules do not prevent the user to act upon the events in the order he or she wants to.

The scope of the invention is only limited by the claims below.

The invention claimed is:

1. A method for providing alerts in a mobile device having a display and a keypad, comprising the steps of:
   detecting an event;
   adding an event presentation associated with the event on an event list; and
   showing the event list or a symbol on the display
   wherein events belong to two categories, and, if a detected event belongs to the first category, the event list is shown automatically, but if a detected event belongs to the second category, the symbol is shown on the display, and the event list is shown on user command only.

2. A method according to claim 1, wherein, after showing the event list, the event list is hidden on user command.

3. A method according to claim 2, wherein the event list is shown on user command.

4. A method according to claim 1, wherein the user commands hiding and showing of the event list by pressing a button of the keypad.

5. A method according to claim 1, further comprising the step of showing detailed information about an event when the corresponding event presentation in the event list is marked.

6. A method according to claim 1, further comprising the step of removing an event presentation from the event list when the corresponding event has been dealt with.

7. A method according to claim 1, wherein event presentations are added in chronological order, preferably the most recent at the top of the event list.

8. A method according to claim 1, wherein event presentations are arranged in prioritised groups, where groups having higher priority are shown at the top of the event list.

9. A method according to claim 8, wherein the prioritised groups are arranged in accordance with user settings.

10. A method according to claim 1, wherein the symbol is a specific symbol for a hidden event list.

11. A method according to claim 1, wherein the symbol is a symbol associated with a new event.

12. A mobile device having a display, a keypad and means for detecting events, and means for storing an event list containing event presentations associated with various events, the mobile device being arranged to:
- detect an event;
- add an event presentation) associated with the event on the event list; and
- show the event list or a symbol on the display, wherein events belong to two categories, the detection means being arranged to distinguish between the two categories, and the mobile device is arranged to show the event list automatically, if a detected event belongs to the first category, but to show the symbol on the display, and the event list on user command only, if a detected event belongs to the second category.

13. A mobile device according to claim 12, wherein the mobile device is arranged, after showing the event list, to hide the event list on user command.

14. A mobile device according to claim 12, wherein the mobile device is arranged to show the event list on user command.

15. A mobile device according to claim 12, wherein the keypad comprises a button for hiding and showing of the event list.

16. A mobile device according to claim 12, wherein the event list has a layered structure, so that each event presentation may carry detailed information in a lower layer.

17. A mobile device according to claim 16, wherein the mobile device is arranged to show detailed information about an event when the corresponding event presentation in the event list is marked.

18. A mobile device according to claim 12, wherein the mobile device is arranged to remove an event presentation from the event list when the corresponding event has been dealt with.

19. A mobile device according to claim 12, wherein the mobile device is arranged to add event presentations in chronological order, preferably the most recent at the top of the event list.

20. A mobile device according to claim 19, wherein the mobile device is arranged to add event presentations in prioritised groups, where groups having higher priority are shown at the top of the event list.

21. A mobile device according to claim 20, wherein the prioritised groups are arranged in accordance with user settings.

22. A mobile device according to claim 12, wherein the symbol is a specific symbol for a hidden event list.

23. A mobile device according to claim 12, wherein the symbol is a symbol associated with a new event.

24. A mobile device according to claim 12, wherein the mobile device is a mobile telephone, a pager, a communicator, an electric organiser, a smartphone or a computer.

* * * * *

UNITED STATES PATENT AND TRADEMARK OFFICE
CERTIFICATE OF CORRECTION

PATENT NO.       : 7,801,567 B2                                      Page 1 of 1
APPLICATION NO.  : 11/719974
DATED            : September 21, 2010
INVENTOR(S)      : Johan Thoresson et al.

It is certified that error appears in the above-identified patent and that said Letters Patent is hereby corrected as shown below:

Front page, Section (60), Related U.S. Application Data should be added:
-- Related U.S. Application Data
(60) Provisional Application No. 60/635,748, filed on Dec. 14, 2004. --

Col. 1, Line 4
Specification, CROSS REFERENCE TO RELATED APPLICATION should be added immediately after the title:
-- CROSS REFERENCE TO RELATED APPLICATION
This application is a §371 of International Application No. PCT/EP2005/055681 filed on November 1, 2005, which claims benefit to U.S. Provisional Application No. 60/635,748 filed on December 14, 2004, and also claims priority to European Application No. 04106184.7 filed on November 30, 2004. --

Signed and Sealed this
Twenty-ninth Day of November, 2011

David J. Kappos
*Director of the United States Patent and Trademark Office*